(12) United States Patent
Bevans et al.

(10) Patent No.: US 6,403,143 B1
(45) Date of Patent: Jun. 11, 2002

(54) FLOWABLE DRY NUTRITIVE MIXTURE AND PROCESS FOR ITS MANUFACTURE

(75) Inventors: Basil D. Bevans; L. Dwain Bunting, both of Quincy; Dan S. Hickman, Payson, all of IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 10 days.

(21) Appl. No.: 09/686,412

(22) Filed: Oct. 11, 2000

(51) Int. Cl.⁷ ............................ A23K 1/16; A23K 1/175

(52) U.S. Cl. ...................... 426/634; 426/630; 426/656; 426/807

(58) Field of Search ............................ 426/634, 656, 426/807, 630

(56) References Cited

U.S. PATENT DOCUMENTS

| | | | | |
|---|---|---|---|---|
| 4,175,121 A | * | 11/1979 | Mantha | 424/94 |
| 4,234,608 A | * | 11/1980 | Linehan | 426/72 |
| 4,775,539 A | * | 10/1988 | Van de Walle | 426/74 |
| 4,988,520 A | * | 1/1991 | Overton | 426/74 |

OTHER PUBLICATIONS

Belasco, I.J., "Stability of Methionine Hydroxy Analog in Rumen Fluid and Its Conversion in Vitro to Methionine by Calf Liver and Kidney", *Journal of Dairy Science* (Aug. 16, 1971) pp. 353–357, vol. 55 (No. 3); published by the American Dairy Science Association, U.S.A.

Belasco, I.J., "Fate of Carbon–14 Labeled Methionine Hydroxy Analog and Methionine in Lactating Dairy Cows", *Journal of Dairy Science* (Jan. 9, 1979) pp. 775–784, vol. 63 (No. 5); published by the American Dairy Science Association, U.S.A.

Fox, D.G. et al., "A Net Carbohydrate and Protein System For Evaluating Cattle Diets: III. Cattle Requirements and Diet Adequacy", *Journal of Animal Science* (1992) pp. 3578–3596, vol. 70; published by the American Society for Animal Science, U.S.A.

Higginbotham, G.E. et al., "Palatability of Methionine Hydroxy Analog or DL– Methionine For Lactating Dairy Cows", *Journal of Dairy Science* (1987) pp/ 630–634, vol. 70; published by the American Dairy Science Association, U.S.A.

Koenig, K.M. et al., "Ruminal Escape, Gastrointestinal Absorption, and Response of Serum Methionine to Supplementation of Liquid Methionine Hydroxy Analog in Dairy Cows", *Journal of Dairy Science* (1999) pp. 355–361, vol. 82; published by the American Dairy Science Association, U.S.A.

McCollum, M.Q. et al., "Absorption of 2–hydrxy–4–(methylthio) butanoic acid by isolated sheep ruminal and omasal epithelia." *Journal of Animal Science* (2000) pp. 1078–1083. vol. 78; published by the American Society for Animal Science, U.S.A.

Patterson, J.A. et al., "Metabolism of DL–Methionine and Methionine Analogs by Rumen Microorganisms", *Journal of Dairy Science* (1988) pp. 3292–3301, vol. 71; published by the American Dairy Science Association, U.S.A.

Polen, C.E. et al., "Methionine Hydroxy Analog: Varying Levels in Lactating Cows", *Journal of Dairy Science* (1970) pp. 607–610, vol. 53; published by the American Dairy Science Association, U.S.A.

Robey, W.W. et al., "An Alternative Approach to Feeding Rumen Undegradable Methionine to Dairy Cows: Optimizing Milk Production", *The Journal of Feed Technology and Marketing* (1996) pp. 1–4; Watt Publications reprinted from Feed Technology, U.S.A.

Schwab, C.G. et al., "Methionine Analogs for Dairy Cows: A Subject Revisited", *Prepared for The California Animal Nutrition Conference* (1998) pp. 1–23; Fresno, CA, U.S.A.

von Keyerlingk, M.A.G. et al., "Use of the Cornell Net Carbohydrate and Protein System and Rumen–protected Methionine to Maintian Milk Production in Cows Receiving Reduced Protein Diets", *Canadian Journal of Animal Science* (1999) pp. 1–5; Agricultural Institute of Canada; Alberta, Canada.

Rulquin, H. et al., "Abstract 1123: A blood procedure to determine bioavailability of rumen–protected Met for ruminants." *J. Anim. Sci. Vo. 78, Suppl. 1/J. Dairy Sci. vol. 83, Suppl. 1* (2000) pp. 268–269; published by the American Dairy Science Association in collaboration with the American Society for Animal Science, U.S.A.

Ferguson, J.D. et al., "Abstract 1124: The effect of rumen–protected methionine on milk production and milk consumption in first lactation Holstein cows fed high protein diets." *J. Anim. Sci. Vo. 78. Suppl. 1/J. Dairy Sci. vol. 83, Suppl. 1* (2000) pp. 268–269; published by the American Dairy Science Association in collaboration with the American Society for Animal Science, U.S.A.

Harrison, J.H. et al., "Abstract 1125: Effect of source of bypass protein and supplemental Alimet® and lysine– HCl on lactation performance." *J. Anim. Sci. Vo. 78. Suppl. 1/J. Dairy Sci. vol. 83, Suppl. 1* (2000) pp. 268–269; published by the American Dairy Science Association in collaboration with the American Society for Animal Science, U.S.A.

(List continued on next page.)

*Primary Examiner*—Chhaya D. Sayala
(74) *Attorney, Agent, or Firm*—Archer-Daniels-Midland Company

(57) ABSTRACT

The present invention relates to dry, flowable nutritive supplement mixtures and to processes for their manufacture. The mixtures of the invention provide liquid nutritive supplements, containing, for example, one or more amino acids, in an organic carrier. The organic carriers of the invention are preferably high-fiber and/or proteinaceous compositions, such as protein byproducts (soybean feed, for example). The process for making the mixtures of the invention involves mixing the liquid nutritive supplements and the organic carrier under controlled conditions for absorption of the supplement into the carrier, followed by multiple or continuous additions of a reactive metal oxide, to produce the dry, flowable nutritive supplement products.

18 Claims, 2 Drawing Sheets

OTHER PUBLICATIONS

Wester, T.J. et al., "Abstract 1126: Metabolism of 2-hydroxy-4-methylthio butanoic acid (HMB) in growing lambs." *J. Anim. Sci. Vo. 78. Suppl. 1/J. Dairy Sci. vol. 83, Suppl. 1* (2000) pp. 268–269; published by the American Dairy Science Association in collaboration with the American Society for Animal Science, U.S.A.

Wester, T.J. et al., "Abstract 1127: Synthesis of methionine (Met) from 2-hydroxy-4-methylthio butanoic acid (HMB) in growing lambs." *J. Anim. Soc. Vo. 78. Suppl. 1/J. Dairy Sci. vol. 83, Suppl. 1* (2000) pp. 268–269; published by the American Dairy Science Association in collaboration with the American Society for Animal Science, U.S.A.

Sloan, B.K. et al., "Abstract 1129: Action of hydroxy methylthio butanoic acid (HMB) in microbial growth and metabolism." *J. Anim. Sci. Vo. 78. Suppl. 1/J. Dairy Sci. vol. 83, Suppl. 1* (2000) pp. 268–269; published by the American Dairy Science Association in collaboration with the American Society for Animal Science, U.S.A.

* cited by examiner

FLOWABLE DRY NUTRITIVE MIXTURE AND PROCESS FOR ITS MANUFACTURE

FIELD OF THE INVENTION

The present invention relates to flowable dry nutritive supplement mixtures, and to processes for making such mixtures. In a particular embodiment, the invention relates to a flowable dry methionine hydroxy analog mixture, and to the process for making such mixtures.

BACKGROUND AND RELATED ART

Amino acids are the basic chemical building blocks of all proteins. As such, they are fundamental to life, and critical to proper and complete nutrition for all living things. While certain amino acids are considered essential in the diets of particular individuals, all of the 20 amino acids that occur in proteins in nature are of critical dietary importance. Amino acid nutritive supplements and/or additives are currently commercially important in the animal/veterinary/pet food and human/medical/food/health supplement industries.

The amino acid methionine is an important nutritional additive in animal feed and pet foods and treats, and particularly in feed used in the dairy industry and in the beef cattle /feed lot industry. Methionine is also an important nutritional additive in the poultry industry.

In one specific area of application, the recent advent of practical software for modeling the amino acid needs of ruminants (Fox, 1992; von Keyserlingk, 1999) has created a rapidly growing market for specialty amino acid products that are protected from rumen fermentation and can deliver specific amino acids directly to the intestine of the animal. Methionine has been identified as one of the most frequently limiting amino acids for milk production, and it is the amino acid whose deficiency is the most difficult to address by manipulation of common feed ingredients. As such, commercial product development efforts have focused primarily on technologies for creating rumen-protected methionine products. Two basic approaches have been used: 1) encapsulation of DL-methionine; and 2) utilization of the inherent low rumen degradability of methionine hydroxy analog (MHA, or methylthiobutanoic acid). MHA, which is slowly degraded in the rumen, has a great deal of potential in the dairy and cattle industries specifically, and in the livestock industry generally, as a cost-effective source of bypass methionine.

Methionine hydroxy analog (specifically, 2-hydroxy-4-methylthio-butanoic acid) is an important commercial product. It is widely used by the poultry and swine industries as a methionine substitute. Although it was initially marketed as a calcium salt, the introduction of liquid MHA by Monsanto, in 1979, provided a much more cost effective source of MHA to the swine and poultry industries, and production of the calcium salt was discontinued in 1994. The advantages of liquid MHA include lower production costs and the economies of scale of liquid handling for large poultry and/or swine producers.

MHA is slowly degraded by rumen bacteria (Belasco, 1972), and thus is able to escape rumen fermentation (Belasco, 1980; Patterson et al., 1988; Koenig et al., 1999). This appears to occur both by natural washout with fluids and by direct transport across the rumen wall (McCollum et al., 2000). Recent research with cattle suggests 40% rumen escape at a 13% hourly rumen turnover rate (Schwab, 1998). MHA is rapidly converted to L-methionine by most ruminant organ tissues (Wester et al., 2000; Balasco, 1980). In dairy rations that are formulated for high levels of milk production and balanced for amino acids, MHA has consistently increased milk volume and/or milk fat composition (Robey, 1996; Koenig et al., 1999; von Keyserlingk et al., 1999).

U.S. Pat. No. 6,017,563 relates to the use of MHA to balance for the methionine requirement of the cow. The patent discloses a process for formulating a ruminant food ration in which the methionine needs of the ruminant are determined and a plurality of natural or synthetic feed ingredients, and the nutrient composition of each, is identified. A ration is then formulated from the identified feed ingredients and the MHA to meet the determined methionine needs of the ruminant.

U.S. Pat. No. 5,456,927 discloses a process for preparing a fatty acid calcium salt ruminant feed supplement product which contains an incorporated MHA calcium salt additive. Numerous patents pertain to the manufacture of 2-hydroxy-4-methylthiobutanoic acid.

Although there is increasing market demand for rumen-protected methionine sources, the cost of commercial sources of rumen-protected methionine has limited their use. Furthermore, although liquid MHA is less than one-half the cost of the encapsulated DL-methionine products per unit of rumen bypass activity, liquid MHA (indeed, liquid forms of micronutrients generally) has found limited industry adaptation. This is due to the fact that liquid MHA is a viscous liquid that tends to impart a tacky or sticky texture to organic carriers when applied at levels in excess of 10–15%. Recommendations of manufacturers of liquid MHA suggest that typical organic carriers be limited to 10–12% loading with liquid MHA in order to preserve flowability.

To date there are only two commercially available dry concentrated forms of MHA available. One form is a low inclusion (3%) liquid MHA encapsulated in calcium salts of fatty acids (Megalac Plus®). In this product the added MHA is merely an additional feature of what is actually a fat-source product, and the cost per unit of bypass methionine activity in the product is 4 times that of liquid MHA. However, the industry does view this product as a source of MHA for dairy rations.

The second dry form of MHA is a high-inclusion (52% liquid MHA) product (Alimet™). This product uses an inorganic silica-based carrier, and is costly. In fact, drying liquid MHA onto a carrier has met with limited success because: 1) as noted above, organic carriers have a limited ability to absorb the liquid MHA; and 2) inorganic carriers (typically aluminosilicates) add considerable cost and make no nutritive contribution to the animal.

Therefore, a significant need exists in several industries generally, such as the animal health and nutrition industry, the feed industry, and even in human food and health industries, and in the dairy and beef cattle industries particularly, for a dry amino acid nutritive product in an organic carrier. Such a product would provide amino acids in a more cost-effective, user-friendly form, with nutritive characteristics far superior to those of the alternative products that are currently available.

SUMMARY OF THE INVENTION

Accordingly, the present invention provides a flowable, dry nutritive supplement/organic carrier nutritional product, and a process for making the product.

It was unexpectedly discovered that a combination of a dry organic carrier, a liquid nutritive supplement, and a reactive metal oxide, when mixed under the proper conditions and in the proper proportions, will produce a flowable dry material that is well suited for use in the preparation of health/nutritive products. Thus, the present invention relates to flowable, dry nutritive supplement/organic carrier mixtures containing some variable level of a reactive metal oxide. In another aspect of the present invention there is provided the process for making the product mixture.

DETAILED DESCRIPTION

Figure 1:
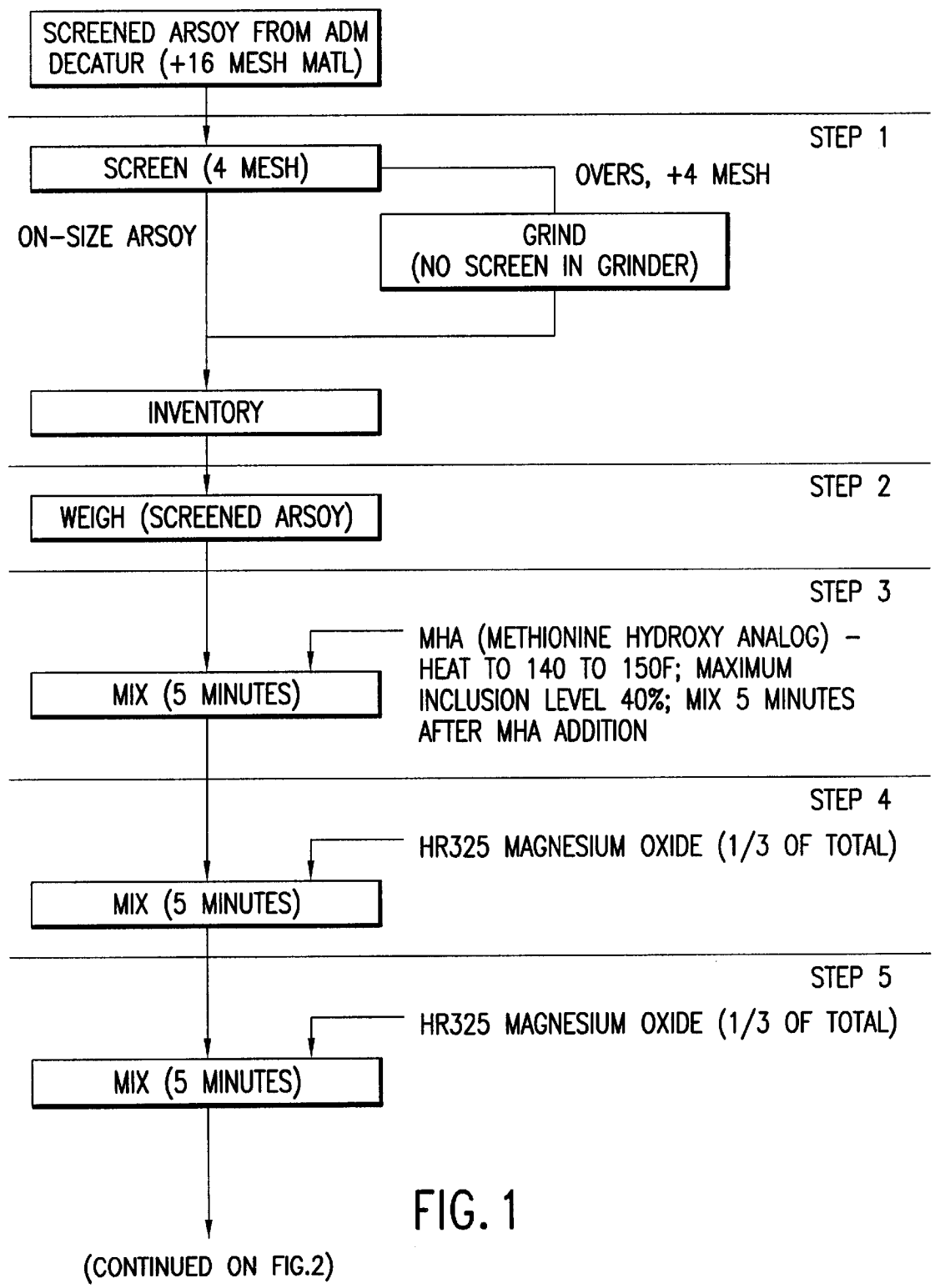
FIGS. 1 and 2 show a flow diagram of one embodiment of the process of the invention; specifically, the figures present a manufacturing embodiment of the process.
Figure 2:
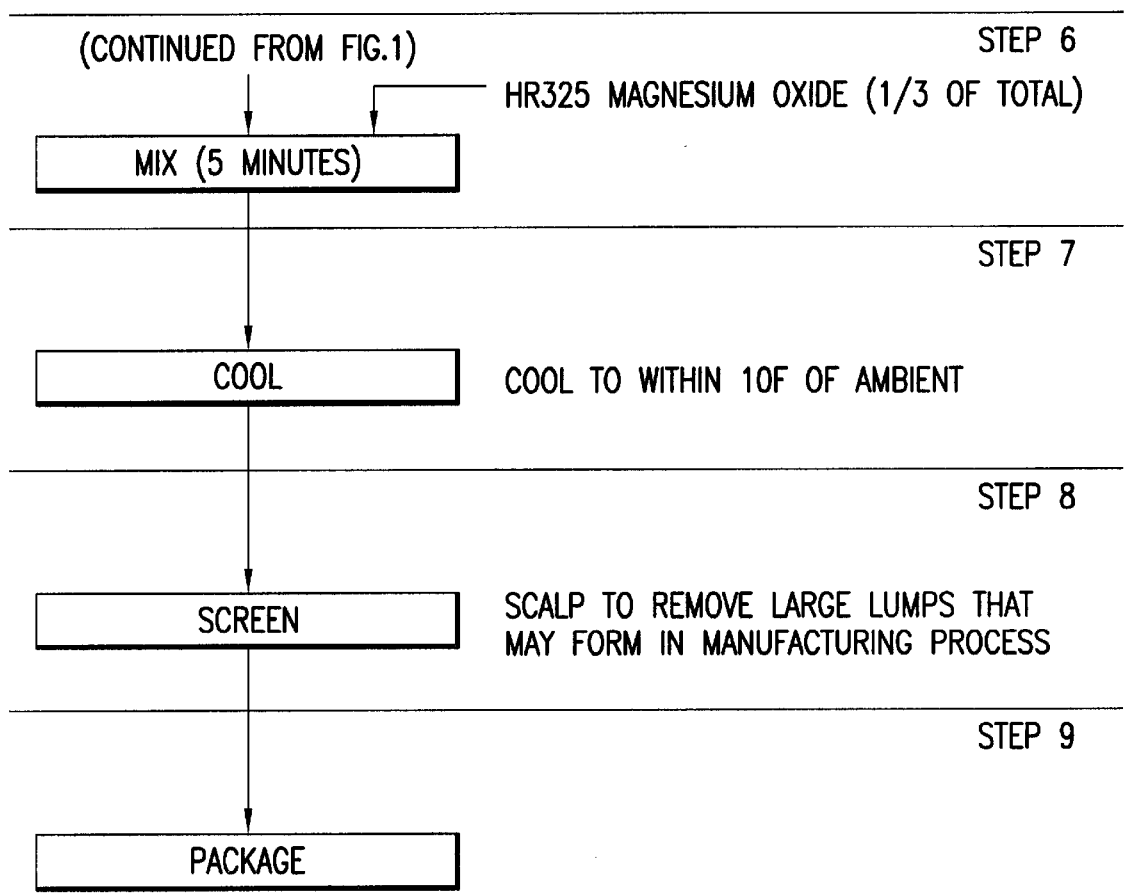

In one embodiment of the invention, a liquid nutritive supplement is mixed with an organic carrier. In preferred embodiments the liquid nutritive supplement comprises a liquid concentrate form of one or more micronutrients and/or amino acid sources, for example liquid MHA. The organic carrier, in preferred embodiments of the invention, is a byproduct protein material with a fiber component. In particularly preferred embodiments the protein and/or fiber component should be readily absorptive of liquid forms of nutritive supplements (liquid MHA, for example). Without intending to be limited by theory, the present inventors have discovered that the organic carrier retains the liquid nutritive material, and this facilitates the subsequent chemical drying process for formation of the flowable dry product. In preferred embodiments of the invention the percentage of crude fiber in the organic carrier is from about 8% to about 40% of the total carrier's make-up. In the currently most preferred embodiments the percentage of crude fiber is from about 11% to about 13%.

The inventors believe that certain byproduct protein/fiber sources (soybean feed, for example) may be uniquely suited for use as the organic carrier in the present invention. In the currently most preferred embodiment the organic carrier is Arsoy® Soybean Feed (Archer Daniels Midland, Decatur, Ill.). The content of readily absorbing fiber in Arsoy® is 11–13% (crude fiber), and in addition the typical amino acid content of protein byproducts such as Arsoy® is highly complementary to the methionine bypass value of MHA. Soybean feed is defined as "the product remaining after the partial removal of protein and nitrogen free extract from dehulled solvent extracted soybean flakes" (American Association of Feed Control Officials, 2000).

In certain embodiments of the present invention it is helpful, although by no means necessary, to sieve the carrier through a U.S. Standard (A.S.T.M. Standard E-11) sieve in order to remove very fine particulate matter. For example, highly fined materials can be removed, in order to produce a more uniform final product, if the organic carrier contains such material, by sieving through a U.S. Standard sieve of from about #16 to about #20. If the carrier contains large clumps they can be removed using such a sieve of about #4 mesh.

In the first step of the mixing process, the liquid form of the nutritive supplement (liquid MHA, for example) is absorbed into the carrier by heating the liquid nutritive supplement, adding it to the carrier, and mixing. In preferred embodiments of the invention the liquid supplement is heated to from about 100 degrees F to about 170 degrees F. In the currently most preferred embodiments, liquid MHA is heated to a temperature of from about 130 degrees F to about 160 degrees F. Generally, the inventors have found that the absorption process is improved at the higher temperatures. Of course those skilled in the art will recognize that the amount of liquid to be absorbed and the temperature of the organic carrier will impact the temperature to which the liquid should be heated for optimum absorption. However, given the present disclosure it will simply be a matter of process parameter optimization for the skilled artisan to determine the best temperature for the components being mixed, and this will not require undue experimentation. The combination is then allowed to mix at the elevated temperature, in a commercial feed mixer (for example), for at least about 5 minutes (preferably for at least about 5 minutes to about 10 minutes) to allow thorough penetration of the liquid into the matrix of the carrier.

A reactive metal, for example reactive magnesium oxide (RMgOx), is then added to the mixture. In preferred embodiments of the invention, a ratio of liquid nutritional supplement to reactive metal oxide from about 5:1 to about 15:1 is achieved in the final product. In the more preferred embodiments the ratio is from about 8.5:1 to about 14:1, and in the currently most preferred embodiment the ration is about 12:1. Those of skill in the art will appreciate that the ratio to be achieved will depend upon the desired amount of liquid nutritive supplement to be absorbed into the carrier, as well as the absorptive qualities of the carrier.

Reactive magnesium oxide, for example HR 325 (Premier Chemicals) is currently the most preferred reactive metal oxide for use in the practice of the invention. However, those of skill in the art will recognize that other similar oxides can be used, including, for example, reactive iron oxide, reactive calcium oxide, reactive zinc oxide, and the like.

In preferred embodiments the reactive metal oxide is added only after the liquid nutritive supplement has been completely absorbed into the carrier (after at least about 5 minutes of mixing, as discussed above). The reactive metal oxide is preferably added in multiple (at least two) equal additions, or in a gradual, continuous addition, as the present inventors have determined that a single lump or bolus addition does not elicit a successful reaction. If multiple additions are made, the reactive metal oxide is added in equal amounts over time, with mixing periods between additions. Alternatively, the reactive metal oxide can be added gradually and continuously over time, with mixing throughout the addition process. In either embodiment, the total amount of reactive metal oxide added will be sufficient to bind all free water and produce a flowable product.

Most preferably, the reactive metal oxide is RMgOx, and in preferred embodiments the RMgOx is added in two or more equal amounts. The first amount is added following the complete absorption of the liquid nutritive supplement into the carrier. The addition of this first amount of RMgOx results in the generation of heat and in the partial agglomeration of fine particles in the mix. This phase takes from about 3 minutes to about 7 minutes, with 5 minutes being preferred. Then a second, equal amount of the reactive metal oxide is added, and mixing continues for from about 3 minutes to about 7 minutes, with 5 minutes being preferred. Alternatively, a third and final amount of the reactive metal oxide can be added. The addition of the final (be it second, third, or more) equal amount brings the ratio of liquid nutritive supplement to reactive metal oxide to the proper level, and also binds the remaining free water and yields a flowable product. Finally, the product is cooled to approximately 10–20 degrees F above ambient temperature, and is then packaged. Without intending to be limited by theory, it is suggested that the cooling is important for quenching the reaction between the reactive metal oxide and the water.

Having provided a general description, the invention will now be more readily understood through reference to the following Examples, provided by way of illustration, and not intended to limit the present invention, unless otherwise specified.

EXAMPLE 1
Preparation of a Dry, Flowable Methionine Hydroxy Analog Product

In a bench-scale test, 4 pounds of liquid methionine hydroxy analog (MHA) was heated to approximately 160 degrees F using a hotplate. The heated liquid MHA was then mixed with 55.3 pounds of Arsoy® Soybean Feed (Archer Daniels Midland Company, Decatur, Ill.) in a Hobart mixer for 3 minutes.

Following the mixing step (i.e., after 3 minutes of mixing), reactive magnesium oxide (RMgOx) was added in two equal increments, with three minutes of continuous mixing between the additions. The addition of the first 2.0 pounds of RMgOx resulted in the agglomeration of fine particles in the mix, and the addition of the second 2.0 pounds resulted in the binding of the remaining free water in the mix. The final ratios of liquid MHA to RMgOx was 10:1. The mixture was then packaged in a poly-lined kraft bag and allowed to cool overnight at room temperature before analysis.

EXAMPLE 2
Scale-Up For Plant Production

Greater than 16 mesh Arsoy® is received and screened to remove pieces larger than 4 mesh. Overs from 4 mesh screening are ground and combined with the material passing through the 4 mesh screen. This material is then stored until use. Using a mixer as a reaction vessel, liquid MHA is added to Arsoy® for approximately 5 minutes, with heating to from about 140° F. to about 160° F. After the approximately 5 minutes of mixing the HR 325 is added in three equal increments, with about 5 minutes of mixing between additions. By the end of the three equal, incremental additions of HR 325 the product has reached a temperature of about 140° F., and is then cooled to approximately 10 degrees above ambient. The cooled product is then screened to remove any large clumps, and is then packaged.

All publications mentioned herein are hereby incorporated in their entirety by reference.

In view of the foregoing description and Examples, those skilled in the art will be able to practice the invention, in various embodiments, without departing from the spirit and scope of the invention as defined in the appended claims.

Relevant Literature

Belasco, I. 1972. Stability of methionine hydroxy analog in rumen fluid and its conversion in vitro to methionine by calf liver and kidney. J. Dairy Sci. 55:353–357.

Belasco, I. 1980. Fate of carbon 14 labeled methionine hydroxy analog and methionine in the lactating dairy cow. J. Dairy Sci. 63:775–784.

Fox, D. et al. 1992. A net carbohydrate and protein system for evaluating cattle diets: III. Cattle requirements and diet adequacy. J. Anim. Sci. 70:3578–3596.

Higginbotham, G. E. et al. 1987. Palatability of methionine hydroxy analog or DL-methionine. J. Dairy Sci. 70:630–634.

Koenig, K. M. et al. 1999. Ruminal escape, gastrointestinal absorption, and response of serum methionine to supplementation of liquid methionine hydroxy analog in dairy cows. J. Dairy Sci. 82:355–361.

McCollum, M. Q. et al. 2000. Absorption of 2-hydroxy-4-(methlthio)butanoic acid by isolated sheep ruminal and omasal epithelia. J. Anim. Sci. 78:1078–1083.

Patterson, J. et al. 1988. Metabolism of DL-methionine and methionine analogs by rumen microorganisms. J. Dairy Sci. 71:3292–3301.

Polan, C. et al. 1970. Methionine hydroxy analog: varying levels for lactating cows. J. Dairy Sci. 53:607–610.

Robey, W. W. 1996. Optimizing milk production. Feed Management 47(12)20–26.

Schwab, C. G. 1998. Methionine analogs for dairy cows: A subject revisited. Proceedings: California Animal Nutrition Conference, Fresno, Calif., pp. 1–23.

Von Keyserlingk, M. A. et al. 1999. Use of the Cornell net carbohydrate and protein system and rumen-protected methionine to maintain milk production in cows receiving reduced protein diets. Can. J. Anim. Sci. 79:397–400.

Wester, T. J. et al. 2000. Metabolism of 2-hydroxy-4-(methlthio)butanoic acid in growing lambs. J. Anim. Sci. 83 (Suppl. 1):269 (abstract).

What is claimed is:

1. A process for making a flowable, dry, product comprising a liquid nutritive supplement, the process comprising:
   a) mixing the liquid nutritive supplement with an organic carrier at a temperature suitable for absorption of the liquid nutritive supplement into the carrier;
   b) adding, with mixing, a reactive metal oxide, in at least two equal amounts, or gradually and continuously over time, such that a final liquid nutritive supplement:reactive metal oxide ratio of from about 5:1 to about 15:1 is achieved; and
   c) cooling the mixture to a temperature from about 10 degrees F to about 20 degrees F above ambient temperature.

2. The process of claim 1 wherein the liquid nutritive supplement comprises one or more concentrated amino acids.

3. The process of claim 2 wherein one of the amino acids is methionine.

4. The process of claim 1 wherein the liquid nutritive supplement is liquid methionine hydroxy analog.

5. The process of claim 1 wherein the organic carrier is a protein byproduct.

6. The process of claim 5 wherein the protein byproduct is soybean feed.

7. The process of claim 1 wherein the reactive metal oxide is selected from the group consisting of iron oxide, calcium oxide, zinc oxide, and magnesium oxide.

8. The process of claim 1 wherein the reactive metal oxide is reactive magnesium oxide.

9. The flowable, dry product produced by the method of claim 1.

10. A flowable, dry, feed/nutritive product comprising a liquid nutritive supplement; an organic carrier; and a reactive metal oxide.

11. The product of claim 10 wherein the liquid nutritive supplement comprises at least one concentrated amino acid.

12. The product of claim 11 wherein the liquid nutritive supplement comprises methionine.

13. The product of claim 12 wherein the liquid nutritive supplement is liquid methionine hydroxy analog at an inclusion level of greater than 3%.

14. The product of claim 10 wherein the organic carrier is a protein byproduct.

15. The product of claim 14 wherein the protein byproduct is soybean feed.

16. The product of claim 10 wherein the reactive metal oxide is selected from the group consisting of iron oxide, calcium oxide, zinc oxide, and magnesium oxide.

17. The product of claim 16 wherein the reactive metal oxide is reactive magnesium oxide.

18. A process for making a flowable, dry nutritive product comprising liquid methionine hydroxy analog in a soybean feed carrier, the process comprising:

a) sieving the soybean feed carrier through a U.S. Standard sieve;

b) mixing liquid methionine hydroxy analog with the sieved carrier for at least about 5 minutes at a temperature of at least about 160 degrees F;

c) adding a first amount of reactive magnesium oxide and mixing for from about 3 to about 5 minutes d) adding a second, equal amount of reactive magnesium oxide and mixing for from about 3 to about 5 minutes;

e) adding a third, equal amount of reactive magnesium oxide to achieve a final liquid methionine hydroxy analog: reactive magnesium oxide ratio of from about 8.5:1 to about 12:1; and f) cooling the mixture to from about +10 to about +20 degrees F above ambient.

* * * * *